United States Patent [19]

Nakagawa et al.

[11] Patent Number: 5,777,959
[45] Date of Patent: Jul. 7, 1998

[54] OPTICAL DISK APPARATUS HAVING A PLURALITY OF OBJECTIVE LENSES

[75] Inventors: Takashi Nakagawa; Yukio Adachi; Masayuki Fujita, all of Tokyo, Japan

[73] Assignee: NEC Corporation, Japan

[21] Appl. No.: 670,153

[22] Filed: Jun. 27, 1996

[30] Foreign Application Priority Data

Jun. 28, 1995 [JP] Japan ............................ 7-162563
Jun. 30, 1995 [JP] Japan ............................ 7-166029

[51] Int. Cl.$^6$ ................................................ G11B 7/00
[52] U.S. Cl. ........................ 369/44.14; 369/44.22; 369/112; 359/824
[58] Field of Search ..................... 369/44.37, 44.38, 369/44.14, 44.21, 44.15, 44.16, 13, 112, 44.22; 359/814, 813, 823, 824

[56] References Cited

U.S. PATENT DOCUMENTS

| | | | |
|---|---|---|---|
| 5,235,581 | 8/1993 | Miyagawa et al. | 369/112 |
| 5,392,273 | 2/1995 | Masaki et al. | 369/116 |
| 5,444,684 | 8/1995 | Yanagi et al. | 369/44.37 |
| 5,479,386 | 12/1995 | Takeshita et al. | 369/44.14 |

FOREIGN PATENT DOCUMENTS

| | | |
|---|---|---|
| 62-66450 | 3/1987 | Japan. |
| 3-113758 | 5/1991 | Japan. |
| 3-201233 | 9/1991 | Japan. |
| 406044584 A | 2/1994 | Japan. |

*Primary Examiner*—Thang V. Tran
*Attorney, Agent, or Firm*—Hayes, Soloway, Hennessey, Grossman & Hage, P.C.

[57] ABSTRACT

An optical disk apparatus includes a carriage, a plurality of objective lens support portions, and a plurality of magnetic field generating means. The carriage is placed to oppose an optical disk and held to be reciprocally movable between an outer peripheral portion of the optical disk and its central portion. Each of the objective lens support portions has an objective lens elastically supported by an elastic member. The magnetic field generating means move each of the objective lenses in a direction perpendicular to the surface of the optical disk and a radial direction of the optical disk. Some of the magnetic field generating means which are used, in pairs, for the objective lens support portions are shared by the plurality of objective lens support portions.

9 Claims, 7 Drawing Sheets

OPTICAL DISK APPARATUS HAVING A PLURALITY OF OBJECTIVE LENSES

BACKGROUND OF THE INVENTION

The present invention relates to an optical disk apparatus for recording information on an optical disk, and reproducing and erasing it therefrom.

With the progress of an advanced information-oriented society, there has been increasing demand for high-density, large-capacity memories. An optical disk is one of the memories which can meet this demand. Three types of optical disks have been put into practice, namely a read-only optical disk, a write once optical disk capable of recording information only once, and an erasable optical disk capable of repeatedly recording/erasing information.

Figure 5A:
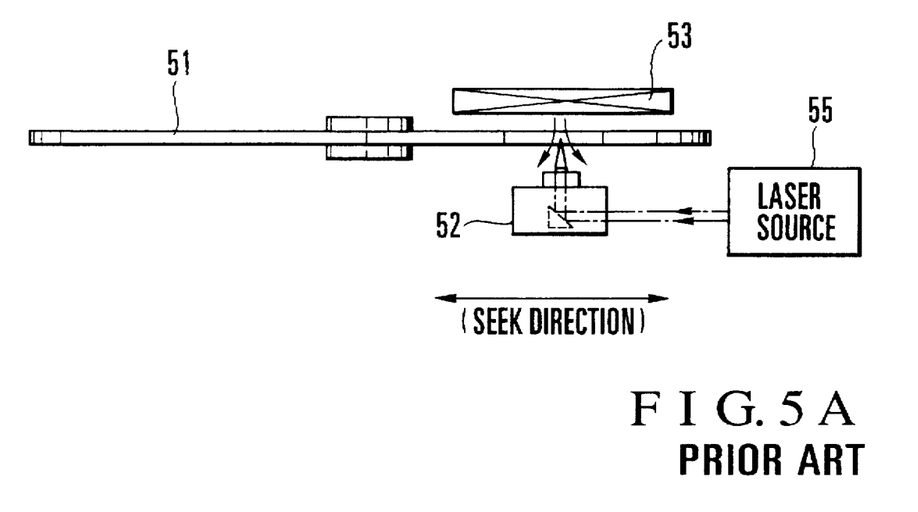
FIGS. 5A and 5B are views for explaining how information is erased from an optical disk by a conventional optical disk apparatus, and how predetermined information is recorded on the optical disk.
Figure 5B:
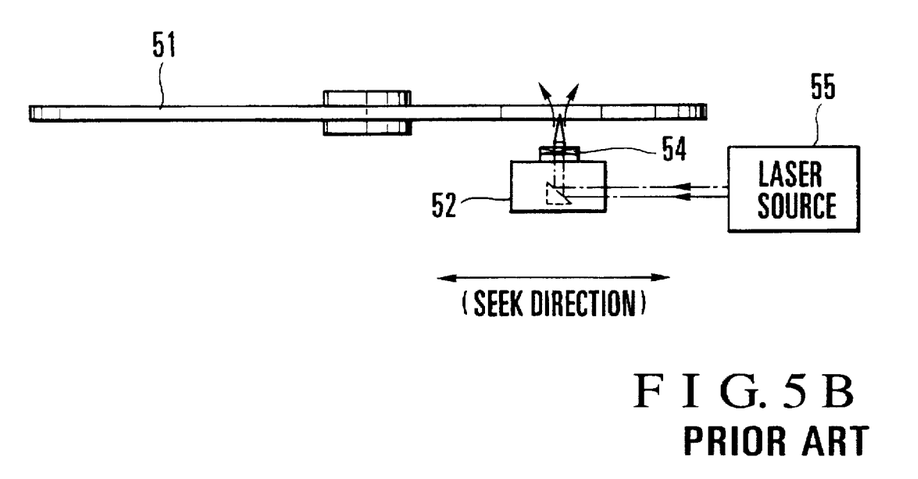

Information is recorded on and erased from this optical disk by a conventional optical disk apparatus in the following manner. A carriage 52 having one optical system for irradiating a laser beam from a fixed optical head (laser source section) 55 onto an optical disk 51 can erase a required number of blocks from an optical disk 51 with its first revolution, as shown in FIG. 5A. The second revolution of the optical disk 51 allows the carriage 52 to record data, as shown in FIG. 5B. The third revolution allows the carriage 52 to reproduce the data. That is, a three-revolution process is required for the above operation.

Figure 6:
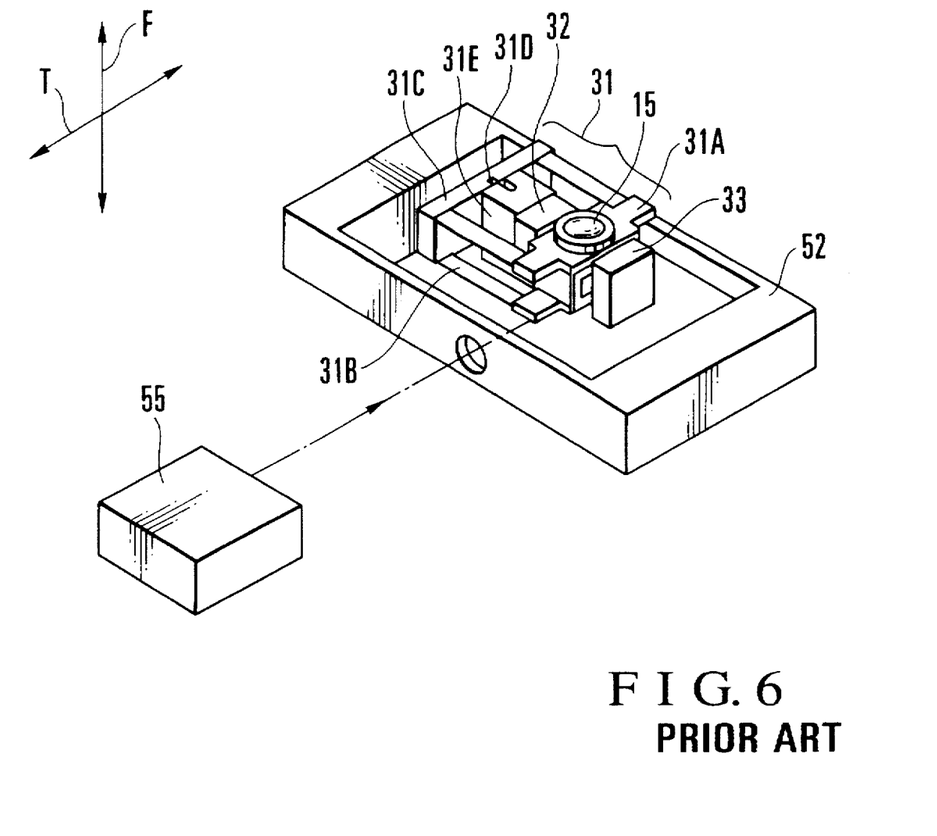
FIG. 6 is a perspective view showing the carriage of the conventional optical disk apparatus.

The structure of the carriage 52 will be described in more detail. As shown in FIG. 6, a lens actuator 31 having an objective lens 15 on one end portion is mounted on the carriage 52. The lens actuator 31 includes a bobbin 31A having the objective lens 15, an arm spring mechanism 31B constituted by four arm-like leaf springs parallel to each other, a leaf spring 31D for holding the actuator body plate 31C, and a fixed holding member 31E fixed on the carriage 52 to hold the actuator body plate 31C via the leaf spring 31D.

Focusing and tracking coils (not shown) are wound on the bobbin 31A. A pair of magnetic field generating means 32 and 33 opposing the focusing and tracking coils are mounted on the carriage 52. With this arrangement, when the tracking coil is energized, the bobbin 31A can be driven in a radial direction T of the disk 51. When the focusing coil is energized, the bobbin 31A can be driven in a direction F perpendicular to the disk surface.

With the three-revolution process described above, however, it is difficult to efficiently handle a large amount of data. There have been increasing demands for a verify function of verifying the contents of data immediately after the data is recorded, an overwrite function of writing new data while erasing previously recorded data, and the like, an optical disk apparatus having a plurality of laser sources has been required.

Figure 7:
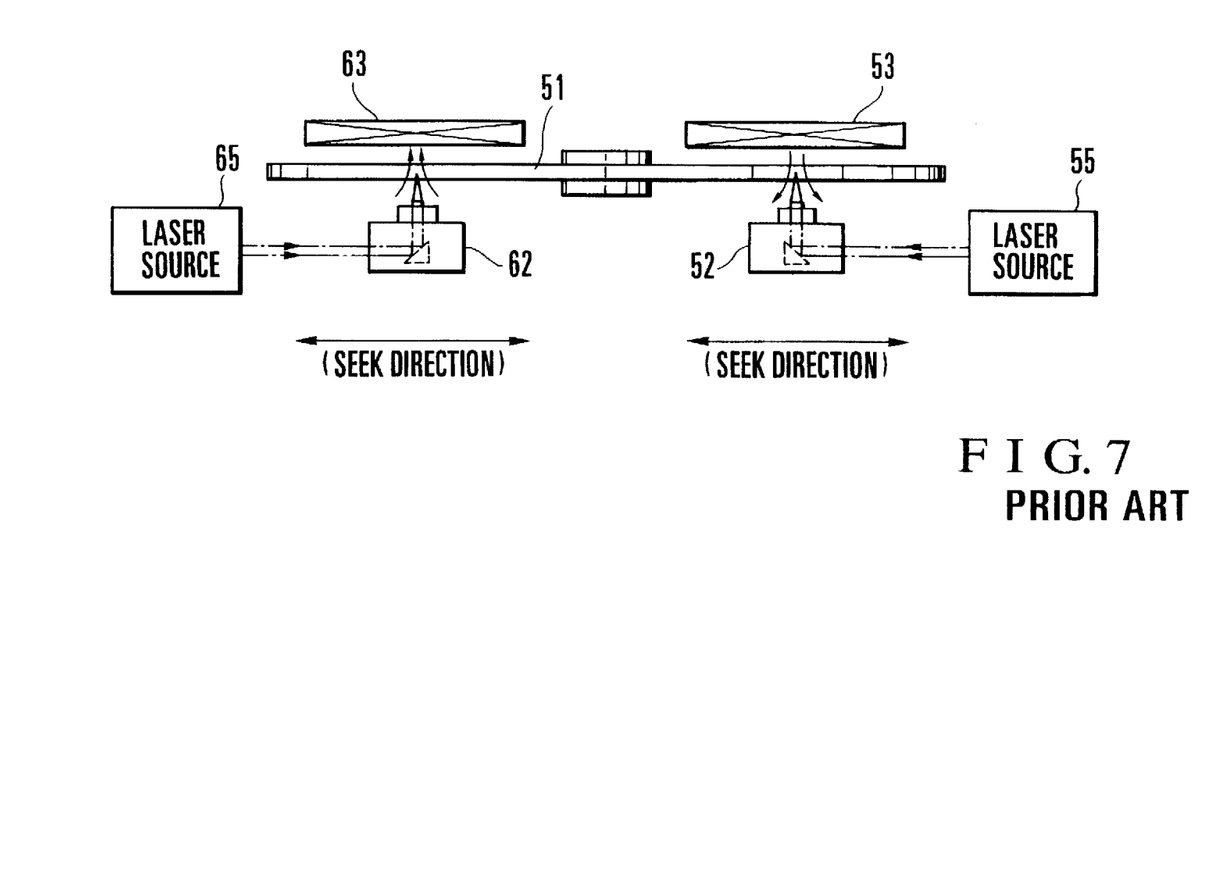
FIG. 7 is a view for explaining how information is erased from an optical disk by another conventional optical disk apparatus, and how predetermined information is recorded on the optical disk.

In order to meet this requirement, apparatuses based on a technique of recording and erasing information, by one revolution of a disk, using optical systems respectively mounted on two carriages 52 and 62, as shown in FIG. 7, have been developed (e.g., Japanese Patent Laid-Open No. 3-113758).

As one type of the above erasable optical disk, a magnetooptic disk has been put into practice. In an optical disk apparatus using this magnetooptic disk, a laser beam is focused onto a disk surface by an objective lens to heat a magnetic thin film up to its Curie point or more, and the magnetization direction of the portion irradiated with the beam is orientated to a desired direction by an external bias

2 magnetic field, thereby recording and erasing information. For this reason, formation of an external bias magnetic field is indispensable for this apparatus.

In the apparatus shown in FIGS. 5A and 5B, an electromagnet 53 as a bias magnetic field generating means must be disposed at a position to oppose the carriage 52 via the optical disk 51, as shown in FIG. 5A, or an electromagnet 54 as a bias magnetic field generating means must be disposed on the carriage 52, as shown in FIG. 5B.

In the apparatus shown in FIG. 7, electromagnets 53 and 63 as bias magnetic field generating means are disposed at positions to oppose the carriages 52 and 62 via an optical disk 51.

As described above, in the conventional optical disk apparatuses, since many magnetic field generating means are used to move the objective lens in the direction perpendicular to the disk 51 and the radial direction of the disk 51, the carriage itself has a large size. As a result, the size of the mounting space for the carriage and its weight increase, interfering with a reduction in the size and weight of the optical disk apparatus. If the size of each magnetic field generating means is reduced to solve this problem, a driving force required to move the objective lens cannot be obtained.

In addition, a carriage having one optical system requires two revolutions of a disk to erase and record information. This makes it difficult to process a large amount of data at a high speed.

A structure having two carriages can erase and record information by one revolution of a disk. However, this structure requires two driving mechanisms for the carriages, resulting in an increase in the size of an optical disk or an increase in cost because of an increase in the number of parts.

Furthermore, when a bias magnetic field generating means is to be disposed to oppose a carriage via an optical disk, a magnetic field with a uniform strength must be applied throughout a recording surface in the radial direction of the optical disk. In addition, this structure needs a mechanism for retracting the bias magnetic field generating means in attaching/detaching the optical disk, interfering with a reduction in the size of the apparatus.

SUMMARY OF THE INVENTION

The present invention has been made to solve the above problems, and has as its first object to provide an optical disk apparatus which allow a reduction in the size and weight of the apparatus.

It is the second object of the present invention to record and erase information at a high speed.

In order to achieve the above objects, according to the present invention, there is provided an optical disk apparatus comprising a carriage placed to oppose an optical disk and held to be reciprocally movable between an outer peripheral portion of the optical disk and a central portion thereof, a plurality of objective lens support portions each having an objective lens elastically supported by an elastic member, and a plurality of magnetic field generating means for moving each of the objective lenses in a direction perpendicular to a surface of the optical disk and a radial direction of the optical disk, wherein some of the magnetic field generating means which are used, in pairs, for the objective lens support portions are shared by the plurality of objective lens support portions.

DESCRIPTION OF THE PREFERRED EMBODIMENT

Figure 1:
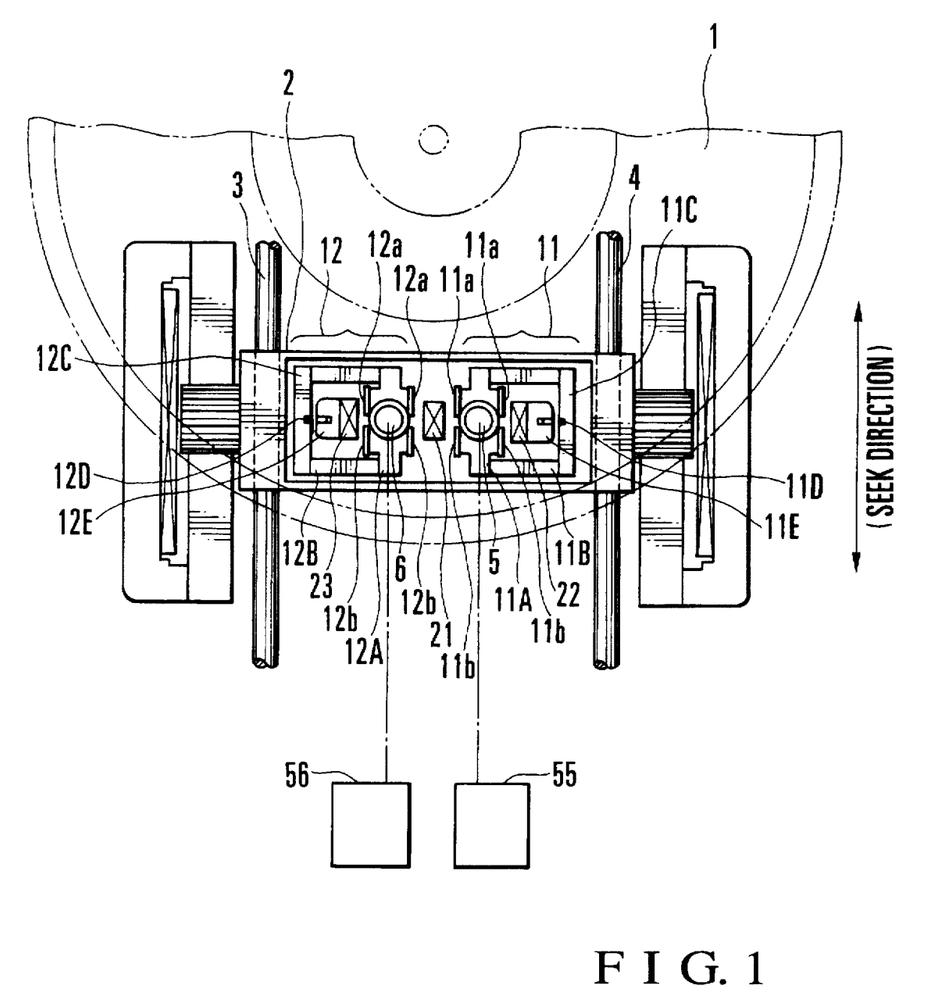
FIG. 1 is a plan view showing the carriage of an optical disk apparatus according to the first embodiment of the present invention.
Figure 2:
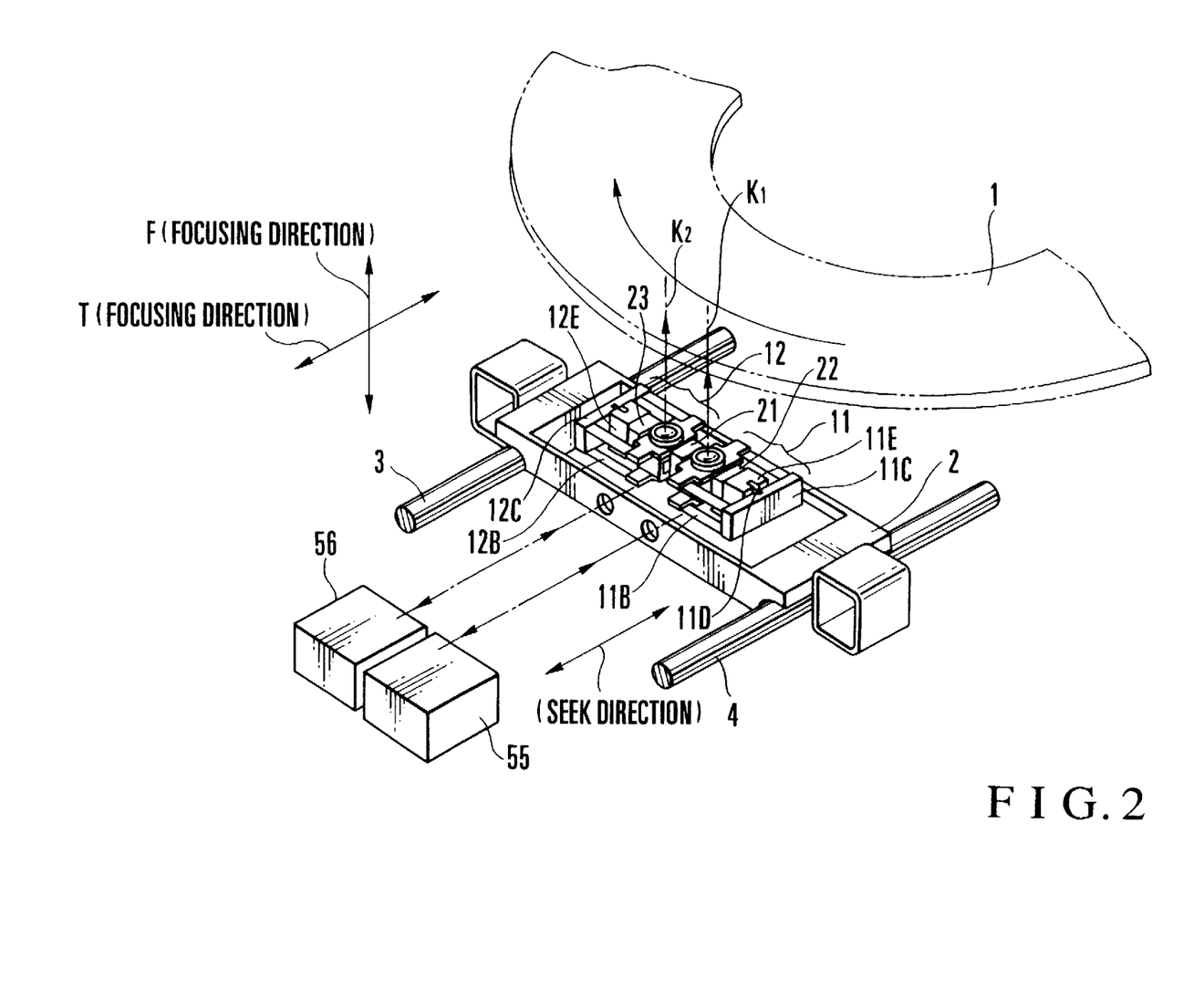
FIG. 2 is a perspective view showing the carriage in FIG. 1.
Figure 3:
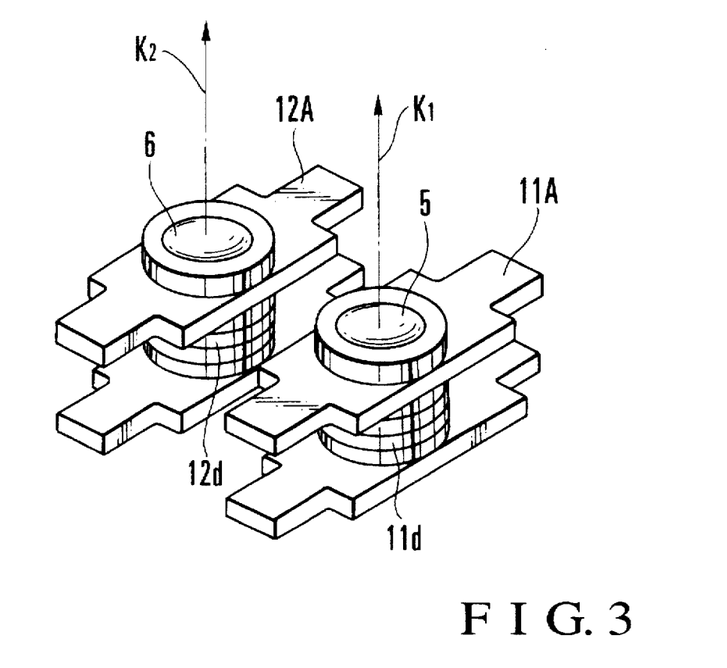
FIG. 3 is an enlarged view showing bobbins arranged in the carriage in FIG. 1.
Figure 4:
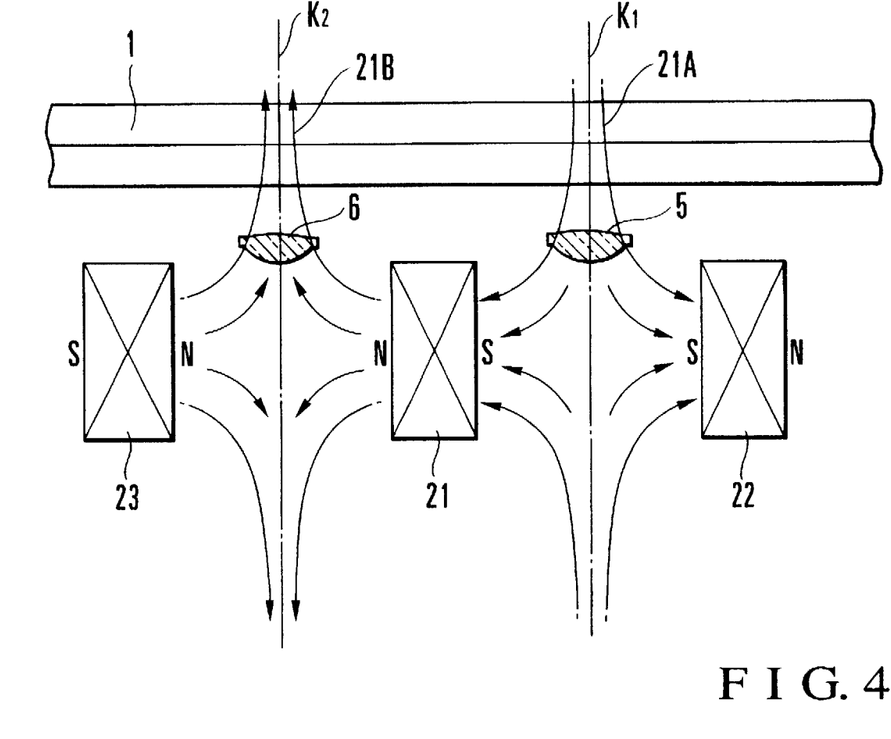
FIG. 4 is a view showing how bias magnetic fields are generated by magnetic field generating means on the carriage in FIG. 1.

FIG. 1 shows the carriage of an optical disk apparatus according to the first embodiment of the present invention. FIG. 2 shows the carriage. FIG. 3 shows bobbins serving as objective lens support portions mounted on the carriage. FIG. 4 shows how bias magnetic fields are generated by magnetic field generating means on the carriage.

Referring to FIGS. 1 and 2, a carriage 2 is disposed on the lower surface side of an optical disk 1 to oppose the optical disk 1. The carriage 2 is held to be reciprocally movable between an outer peripheral portion of the optical disk 1 and its central portion. Guide rails 3 and 4 hold the carriage 2 and guide its reciprocal movement.

An erasing lens actuator 11 and a recording lens actuator 12 are mounted on the carriage 2. The erasing lens actuator 11 has an erasing objective lens 5 on one end portion. The erasing objective lens 5 erases information from the optical disk 1. The recording lens actuator 12 has a recording objective lens 6 on one end portion. The recording objective lens 6 records information on the optical disk 1.

The erasing lens actuator 11 and the recording lens actuator 12 are disposed such that their portions on the objective lens (5, 6) sides are located near each other, and the objective lenses 5 and 6 are almost parallel in the circumferential direction (i.e., along the tangent of a track) of the optical disk 1 (i.e., perpendicular to a radial direction T of the disk as the moving direction of the carriage 2).

The erasing lens actuator 11 and the recording lens actuator 12 are also disposed such that two laser beams emerging from optical heads (laser source sections) 55 and 56 are incident on the same track on the optical disk 1 via the objective lenses 5 and 6.

The erasing lens actuator 11 includes a bobbin 11A having the erasing objective lens 5, an arm spring mechanism 11B constituted by four arm-like leaf springs parallel to each other, an actuator body plate 11C for holding the arm spring mechanism 11B, a leaf spring 11D for holding the actuator body plate 11C, and a fixed holding member 11E disposed in a central space surrounded by the bobbin 11A, the arm spring mechanism 11B, and the plate 11C to hold the plate 11C via the leaf spring 11D. This fixed holding member 11E is fixed on the carriage 2.

Each of two end portions (extending in the radial direction T) of each of the upper and lower ends (in a focusing direction F in FIG. 2) of the bobbin 11A as an objective lens support portion having the erasing objective lens 5 is supported by one end of a corresponding one of the leaf springs of the arm spring mechanism 11B. The other end of each of the leaf springs of the arm spring mechanism 11B is supported by the actuator body plate 11C.

The leaf spring 11D for holding the actuator body plate 11C is parallel to an optical axis K1 of the erasing objective lens 5, and the surface of the leaf spring 11D is perpendicular to the moving direction of the carriage 2. Owing to the biasing force of the leaf spring 11D, the actuator body plate 11C can reciprocally move about the leaf spring 11D within a plane parallel to the rotating surface of the optical disk 1.

That is, the arm spring mechanism 11B allows the bobbin 11A to move in the direction F perpendicular to the surface of the optical disk, whereas the leaf spring 11D allows the bobbin 11A to move in the radial direction T. With this arrangement, a laser beam emerging from the erasing objective lens 5 can be focused at an arbitrary position on the optical disk 1.

The recording lens actuator 12 mounted in the opposite direction to the erasing lens actuator 11 has the same structure as that of the erasing lens actuator 11, and functions in the same manner.

The recording lens actuator 12 includes a bobbin 12A having the recording objective lens 6, an arm spring mechanism 12B constituted by four arm-like leaf springs parallel to each other, an actuator body plate 12C for holding the arm spring mechanism 12B, a leaf spring 12D for holding the actuator body plate 12C, and a fixed holding member 12E fixed on the carriage 2 to hold the actuator body plate 12C via the leaf spring 12D.

Each of the two end portions (extending in the radial direction T) of each of the upper and lower ends of the bobbin 12A as an objective lens support portion having the recording objective lens 6 is supported by one end of a corresponding leaf spring of the arm spring mechanism 12B. The other end of each leaf spring of the arm spring mechanism 12B is supported by the actuator body plate 12C.

The leaf spring 12D for holding the actuator body plate 12C is parallel to an optical axis K2 of the recording objective lens 6, and the surface of the leaf spring 12D is perpendicular to the moving direction of the carriage 2.

That is, the arm spring mechanism 12B allows the bobbin 12A to move in the direction F perpendicular to the surface of the optical disk, whereas the leaf spring 12D allows the bobbin 12A to move in the radial direction T. With this arrangement, a laser beam emerging from the recording objective lens 6 can be focused at an arbitrary position on the optical disk 1.

Tracking coils 11a and 11b for driving the objective lens 5 in the radial direction T are mounted on side surfaces of the bobbin 11A. In addition, as shown in FIG. 3, a focusing coil 11d for driving the objective lens 5 in the focusing direction F is wound on a shaft (not shown) whose center coincides with the optical axis K1.

Permanent magnets 21 and 22 as a pair of magnetic field generating means are mounted on the carriage 2 to oppose the focusing coil 11d and the tracking coils 11a and 11b.

Similarly, tracking coils 12a and 12b for driving the objective lens 6 in the radial direction T are mounted on side surfaces of the bobbin 12A. In addition, as shown in FIG. 3, a focusing coil 12d for driving the objective lens 6 in the focusing direction F is wound on a shaft (not shown) whose center coincides with the optical axis K2. Referring to FIG. 3, in order to clearly show the focusing coils, illustrations of the tracking coils 11a, 11b, 12a, and 12b are omitted.

The permanent magnet 21 and a permanent magnet 23 as a pair of magnetic field generating means are mounted on the carriage 2 to oppose the focusing coil 12a and the tracking coils 12a and 12b.

The bobbins 11A and 12A therefore share the permanent magnet 21 disposed therebetween.

The three permanent magnets (or electromagnets) 21, 22, and 23 are disposed on both sides of each of the optical axes K1 and K2 of the objective lenses 5 and 6 to oppose each other such that the magnetic poles having the same polarities face each other (see FIG. 4). With this arrangement of the permanent magnets 21 to 23, owing to the repulsion between magnetic fields, a magnetic flux density distribution like the one shown in FIG. 4 is formed. As a result, leakage magnetic fields 21A and 21B having different magnetic field directions with respect to the optical disk 1 are generated.

The bobbin 11A can be driven in the radial direction T by energizing the tracking coils 11a and 11b in the magnetic field generated by the permanent magnets 21 and 22. The bobbin 11A can also be driven in the direction F by energizing the focusing coil 11d. Similarly, the bobbin 12A can be driven in the radial direction T by energizing the tracking coils 12a and 12b in the magnetic field generated by the permanent magnets 21 and 23. The bobbin 12A can also be driven in the direction F by energizing the focusing coil 12d.

Servo control is performed in the focusing and tracking directions on the basis of focusing and tracking error signals obtained from the optical heads 55 and 56, thereby causing laser beams from the objective lenses 5 and 6 to follow the same track on the optical disk 1. With this arrangement, information can be erased and recorded by one revolution of the optical disk 1.

The strength of the magnetic field 21A which is formed by the first and second permanent magnets 21 and 22 and leaks in a direction perpendicular to a disk surface that the objective lens 5 opposes is set within the range of bias magnetic field strengths required for an erasing operation.

The strength of the magnetic field 21B which is formed by the first and third permanent magnets 21 and 23 and leaks in a direction perpendicular to a disk surface that the objective lens 6 opposes is set within the range of bias magnetic field strengths required for a recording operation.

If the magnetic pole strengths of the permanent magnets are specified such that the strengths of the leakage magnetic fields 21A and 21B can be maintained in the ranges of bias magnetic field strengths required for erasing and recording operations, portions of the magnetic field generating means for driving the objective lenses can be used as bias magnetic field generating means.

In general, a bias magnetic field strength for the optical disk 1 is about 200 to 400 [Oe]. Since an open type magnetic circuit like the one shown in FIG. 4 generates large leakage magnetic fields, a magnetic field strength of about 200 to 400 [Oe] can be easily obtained.

In this embodiment, the mechanisms using the leaf springs are used as mechanisms for supporting the bobbins 11A and 12A. As is apparent, however, the same effect can be obtained by using, e.g., a four-wire supporting scheme.

In this embodiment, the erasing lens actuator 11 and the recording lens actuator 12 are mounted on the carriage 2. However, the present invention is not limited to this. For example, the apparatus may include a reproducing lens actuator (reproducing objective lens support portion) corresponding to a laser beam for reproducing information and a recording lens actuator, or may include a recording/reproducing lens actuator (recording/reproducing lens support portion) corresponding to a laser beam for recording/reproducing information, and an erasing lens actuator.

According to the present invention, as described in claims 1 and 2, since some of magnetic field generating means are shared by a plurality of objective lens support portions, the number of magnetic field generating means can be decreased, and the number of parts of a carriage can be decreased. In addition, by mounting a plurality of objective lens support portions on one carriage, a plurality of carriages and their driving mechanisms which are required in a conventional apparatus can be reduced in number to one. Therefore, the structure can be simplified, and the number of parts can be greatly decreased. The overall space occupied by the carriage can be reduced. As a result, the mounting space for the optical disk apparatus and its weight can be reduced to realize a compact, lightweight apparatus. In addition, since a compact carriage can be realized without reducing the size of the magnetic field generating means, a decrease in driving force due to a reduction in the size of the magnetic field generating means can be prevented.

As described in claim 3, since an erasing objective lens support portion and a recording objective lens support portion are mounted on one carriage, information erasing and recording operations can be performed by one revolution of a disk, and high-speed processing can be realized. As a result, high-speed overwrite processing can be realized. That is, new information can be written at a high speed while previously recorded information is erased.

As described in claim 4, since a recording objective lens support portion and a reproducing objective lens are mounted on one carriage, information recording and reproducing operations can be performed by one revolution of a disk, and high-speed processing can be realized. As a result, high-speed verify processing of verifying the contents of information immediately after the information is recorded can be realized.

As described in claim 5, since an erasing objective lens support portion and a recording/reproducing objective lens support portion are mounted on one carriage, information erasing and recording operations or recording and reproducing operations can be performed by one revolution of a disk, and high-speed processing can be realized. As a result, high-speed overwrite processing and high-speed verify processing can be realized.

As described in claims 6 to 8, since magnetic field generating means are disposed on both sides of each of the optical axes of objective lenses such that the magnetic poles having the same polarities face each other, bias magnetic fields for information erasing and recording operations can be generated by magnetic field generating means for driving objective lenses, and no dedicated bias magnetic field means is required. Therefore, the number of parts of the optical disk apparatus can be decreased, and a compact apparatus can be realized. In addition, since any bias magnetic field generating means need not be mounted on the carriage, a deterioration in servo characteristics due to the influence of a magnetic field from a bias magnetic field generating means on the magnetic field generating means for driving the objective lenses can be prevented, and a decrease in access speed due to an increase in the weight of the carriage can also be prevented.

What is claimed is:

1. An optical disk apparatus comprising:
   a carriage placed to oppose an optical disk and held to be reciprocally movable between an outer peripheral portion of the optical disk and a central portion thereof;

a plurality of objective lens support portions each having an objective lens elastically supported by an elastic member; and a plurality of magnetic field generating means for moving each of said objective lenses in a direction perpendicular to a surface of said optical disk and a radial direction of said optical disk, wherein some of said magnetic field generating means which are used, in pairs, for said objective lens support portions are shared by said plurality of objective lens support portion; and wherein at least one of said magnetic field generating means is shared by said objective lenses.

2. An apparatus according to claim 1, wherein said plurality of objective lens support portions comprise first and second objective lens support portions, and said plurality of magnetic field generating means comprise first to third magnetic field generating means, said first magnetic field generating means being disposed between said first and second objective lenses, said second magnetic field generating means being disposed on an opposite side to said first magnetic field generating means via said first objective lens, and said third magnetic generating means being disposed on an opposite side to said first magnetic field generating means via said second objective lens.

3. An apparatus according to claim 1, wherein said plurality of objective lens support portions comprise two objective lens support portions, one of said two objective lens support portions serving as an erasing objective lens support portion corresponding to a laser beam for erasing information from the optical disk, and the other portion serving as a recording objective lens support portion corresponding to a laser beam for recording information on the optical disk.

4. An apparatus according to claim 1, wherein said plurality of objective lens support portions comprise two objective lens support portions, one of said two objective lens support portions serving as a recording objective lens support portion corresponding to a laser beam for recording information from the optical disk, and the other portion serving as a reproducing objective lens support portion corresponding to a laser beam for reproducing information on the optical disk.

5. An apparatus according to claim 1, wherein said plurality of objective lens support portions comprise two objective lens support portions, one of said two objective lens support portions serving as an erasing objective lens support portion corresponding to a laser beam for erasing information from the optical disk, and the other portion serving as a recording/reproducing objective lens support portion corresponding to a laser beam for recording/reproducing information on the optical disk.

6. An optical disk apparatus comprising a carriage placed to oppose an optical disk and held to be reciprocally movable between an outer peripheral portion of the optical disk and a central portion thereof, said carriage having an erasing objective lens support portion having an erasing objective lens for focusing a laser beam for erasing information from the optical disk, a recording objective lens support portion having a recording objective lens for focusing a laser beam for recording information on the optical disk, and a plurality of magnetic field generating means for moving each of said objective lenses in a direction perpendicular to a surface of said optical disk and a radial direction of said optical disk, wherein said erasing objective lens support portion and said recording objective lens support portion are disposed such that said objective lenses are parallel to each other in a circumferential direction of said optical disk, and said magnetic field generating means are disposed on both sides of each of optical axes of said objective lenses such that magnetic poles having the same polarities face each others, and at least one said magnetic field generating means is shared by said recording and erasing objective lenses.

7. An apparatus according to claim 6, wherein said plurality of magnetic field generating means comprise first to third magnetic field generating means, said first magnetic field generating means being disposed between said recording objective lens and said erasing objective lens, said second magnetic field generating means being disposed on an opposite side to said first magnetic field generating means via said erasing objective lens, and said third magnetic field generating means being disposed on an opposite side to said first magnetic field generating means via said recording objective lens.

8. An apparatus according to claim 7, wherein a strength of a magnetic field formed by said first and second magnetic field generating means and leaking in a direction perpendicular to said disk surface that said erasing objective lens opposes is set within a range of bias magnetic field strengths required to erase information from the optical disk, and a strength of a magnetic field formed by said first and third magnetic field generating means and leaking in a direction perpendicular to said disk surface that said recording objective lens opposes is set within a range of bias magnetic field strengths required to record information on the optical disk.

9. An apparatus according to claim 1, wherein a permanent magnet is used as said magnetic field generating means.

* * * * *

UNITED STATES PATENT AND TRADEMARK OFFICE
CERTIFICATE OF CORRECTION

PATENT NO.   :   5,777,959
DATED        :   July 7, 1998
INVENTOR(S)  :   Takashi Nakagawa, Yukio Adachi and Masayuki Fujita It is certified that error appears in the above-identified patent and that said Letters Patent is hereby corrected as shown below:

Claim 6, Col. 8, line 25, "others," should be --other--.

Signed and Sealed this

Twentieth Day of October, 1998

Attest:

BRUCE LEHMAN

*Attesting Officer*     *Commissioner of Patents and Trademarks*